(12) United States Patent
Fitzgerald (10) Patent No.: US 7,025,427 B2
(45) Date of Patent: Apr. 11, 2006

(54) WHEEL ARRANGEMENT (75) Inventor: Kevin R. Fitzgerald, Long Beach, CA (US)

(73) Assignee: KMC Wheel Company, Compton, CA (US)

( * ) Notice: Subject to any disclaimer, the term of this patent is extended or adjusted under 35 U.S.C. 154(b) by 164 days.

(21) Appl. No.: 10/687,144

(22) Filed: Oct. 16, 2003

(65) Prior Publication Data
US 2005/0082902 A1 Apr. 21, 2005

(51) Int. Cl.
B60B 3/12 (2006.01)
B60B 21/00 (2006.01)

(52) U.S. Cl. ............................. 301/95.107; 301/63.107
(58) Field of Classification Search .................. 301/6.1, 301/6.5, 6.9, 63.107, 63.108, 95.101, 95.107, 301/95.108
See application file for complete search history.

(56) References Cited

U.S. PATENT DOCUMENTS

| 2,099,410 | A | * | 11/1937 | Ryerson | ................. 301/95.105 |
| 2,734,778 | A | * | 2/1956 | Cook | ............................. 301/8 |
| 3,346,301 | A | * | 10/1967 | Hurst, Jr. et al. | ............. 301/65 |
| 3,709,561 | A | * | 1/1973 | De Biasse et al. | ........... 301/6.8 |
| 3,758,161 | A | | 9/1973 | Bradley et al. | |
| 4,286,825 | A | * | 9/1981 | Sieving | ................. 301/95.105 |
| 4,436,133 | A | | 3/1984 | Rohr | |
| 6,527,346 | B1 | * | 3/2003 | Chen | ....................... 301/37.24 |
| 6,547,123 | B1 | | 4/2003 | Kemmerer | |
| 6,767,069 | B1 | * | 7/2004 | Chen | ..................... 301/95.106 |

* cited by examiner

Primary Examiner—Russell D. Stormer
(74) Attorney, Agent, or Firm—Dykema Gossett PLLC (57) ABSTRACT A wheel arrangement is provided which has reinforcing rings adjacent inboard and outboard tire bead seats. The outboard reinforcement ring has a radial width which is substantially greater than the radial width of the inboard reinforcement ring.

24 Claims, 6 Drawing Sheets

WHEEL ARRANGEMENT

THE FIELD OF THE INVENTION

The field of the present invention is that of an arrangement for a wheel for a multiple passenger automotive vehicle. More particularly, the present invention relates to wheels for passenger, sport utility, or light truck vehicles which can be used on highways. The present invention can also be used on off highway vehicles.

BACKGROUND OF THE INVENTION

Motor vehicles which are used off the road can often encounter unexpected obstacles. If a vehicle wheel hits an unintended obstacle, the tire can be displaced to an extent that the obstacle can come in direct contact with the wheel drum. This contact most typically occurs in the area adjacent to the tire bead seats. Contact with the wheel can cause the wheel to be bent and become unbalanced. Contact can also damage the tire bead seat which can cause the tire to not seal properly. There have been wheels which are reinforced for very small all terrain vehicles which have been reinforced along the inboard and outboard ends. However, such wheels have not been desirable for large vehicles such as sport utility vehicles or light trucks for a multitude of reasons. Most multiple passenger automotive vehicles on the front wheels at least have disc-type brakes. The disc brakes on multiple passenger vehicles (especially sport utility vehicles or light trucks) require a large amount of clearance on the inboard side. Additionally, it is desirable in large vehicles that in failure mode of the wheel preferably occur on the inboard rather than the outboard side of the wheel if the wheel hits an unintended obstacle. Therefore it is desirable that the rigidity of the wheel on the outboard side be greater than the rigidity of the wheel on the inboard side. Accordingly, it is desirable to provide an arrangement of an automotive multiple passenger vehicle wheel which is better suited for all terrain use which does not suffer from the prior deficiencies of prior vehicle wheel arrangements.

SUMMARY OF THE INVENTION

To make manifest the above noted desires, a revelation of the present invention is brought forth. In a preferred embodiment, the present invention provides an arrangement of an automotive multiple passenger vehicle wheel. The vehicle wheel includes a wheel disc having a central body with a pilot aperture. The central body of a disc is encircled by concentric lug receiving apertures. The wheel disc also has an outer diameter surface. A drum is provided. The drum has extreme inboard and outboard ends. The drum also has an inner surface. An outer surface of the drum adjacent the inboard and outboard ends provides a tire bead seat. The drum is weldably connected to the wheel disc outer diameter surface between the drum inboard and outboard extreme ends. An outboard reinforcement ring is provided. The outboard reinforcement ring has an outer diameter which is generally continuously welded to the inner diameter surface of the drum adjacent to the drum extreme outboard end. The outboard reinforcement ring has an inner diameter which is less than the outer diameter of the wheel disc. The outboard reinforcement ring has apertures to allow for the removal of trapped moisture between the outboard reinforcement ring and the drum. An inboard reinforcement ring is also provided. The inboard reinforcement ring has an inner diameter which is generally continuously welded to the inner diameter surface of the drum adjacent to the drum inner diameter surface extreme inboard end. The inboard reinforcement ring has an outer diameter generally equal to an outer diameter of the outboard reinforcement ring. The inboard reinforcement ring has an inner diameter significantly larger than the outboard reinforcement ring inner diameter and the inboard ring inner diameter is greater than the outer diameter of the wheel disc.

Other advantages of the present invention will become apparent to those skilled in the art as the invention is further explained in the accompanying drawings and detailed description.

DETAILED DESCRIPTION OF THE INVENTION

Referring to FIGS. 1–4 an arrangement of an automotive multiple-passenger vehicle wheel arrangement 7 is provided. The wheel arrangement includes a wheel disc 10. The wheel disc has a central body 12. The wheel disc central body has a central pilot aperture 14. The pilot aperture 14 is encircled by concentric lug receiving apertures 16. The wheel disc 10 has an outer diameter surface 18. The wheel disc 10 has a plurality of spoke holes 20. The spoke holes 20 have an outer diameter 22.

A drum (i.e. rim) 24 is provided. The drum 24 has an extreme outboard end 26. The drum 24 has an extreme inboard end 28. The drum 24 has an outer diameter surface 30. The drum has an outboard tire bead seat 31 with an outer surface 32. The drum has an inboard tire bead seat 33 with an outer surface 34. The drum 24 has an inner diameter surface 36. The outer diameter surface 18 of the wheel disc is fixably connected to the inner diameter surface 36 of the drum. Typically, this connection will be by welding or by an integral casting operation. The connection of the wheel disc to the inner diameter surface 36 of the drum is between the inboard and outboard extreme ends 28 and 26 of the drum.

An outboard reinforcement ring 38 is provided. The outboard reinforcement ring has an outer diameter 40. The outer diameter 40 of the outboard reinforcement ring is connected with the outboard tire bead seat 31 along the drum inner diameter surface 36 by a generally continuous weld 42. The outboard reinforcement ring 38 is positioned adjacent to the drum extreme outboard end 26. The outboard reinforcement ring has an inner diameter 44 which is less than the outer diameter of the wheel disc 10 along its outer diameter surface 18. In most instances, the inner diameter 44 of the outboard reinforcement ring will be less than the outer diameter 22 of the spoke holes. The thickness of the outboard reinforcement ring 38 will typically be at a ration of 1:1.5 to 1:1.75 of the thickness of the drum 34 in the outboard tire B area 32.

The outboard reinforcement ring 40 has a series of geometrically spaced apertures 46 and 48. The apertures 46 and 48 allow for the removal of entrapped moisture between the outboard reinforcement ring 38 and the drum 24. Additionally, the apertures 48 and 46 reduce the overall weight of the outboard reinforcement ring and can provide a pleasant aesthetic appearance.

The wheel arrangement 7 also has an inboard reinforcement ring 50. The inboard reinforcement ring 50 has an outer diameter 52. The inboard reinforcement ring 52 outer diameter is connected to the inboard tire bead seat 34 along the inner diameter surface 38 of the drum by a generally continuous weld 54 adjacent to the drum inboard extreme end 28. The outer diameter 52 of the inboard reinforcement ring is generally equal in diameter to the outer diameter 40 of the outboard reinforcement ring. An inner diameter 56 of the inboard reinforcement ring is significantly larger than the inner diameter 44 of the outboard reinforcement ring. Additionally, the inner diameter 56 of the inboard reinforcement ring 50 is greater than the diameter of the outer diameter surface 18 of the wheel disc. A ratio of radial width of the inboard reinforcement ring 50 to that of outboard reinforcement ring 38 is generally ½ or less. The inboard reinforcement ring 50 has a series of optionally geometrically space apertures 58 to allow for the removal of entrapped moisture between the inboard reinforcement ring 50 and the drum 24.

The drum 24 has its thickest portion along section 60. The drum 60 also has its most radial bend or portion in section 62. The thickened portion 60 along with the most radially section 62 (excluding the tire bead seats 31 and 33) with the enlarged size of the outboard reinforcement 38 caused the outboard side 7 of the wheel to be significantly stronger and stiffer than the inboard side of the wheel. Accordingly, if a large object is encountered by wheel such that the tire is deflated to cause the tire to come into direct contact with the object, the induced failure mode would be a collapse of the wheel inboard side before the outboard side. For large vehicles, such a failure mode is preferable. The larger inner diameter 56 of the inboard reinforcement allows for greater clearance for disc brake caliper. A larger clearance for the disc brake caliper allows the use of a disc brake rotor with a greater diameter and hence allows a higher capacity braking system to be utilized on the vehicle.

Figure 1:
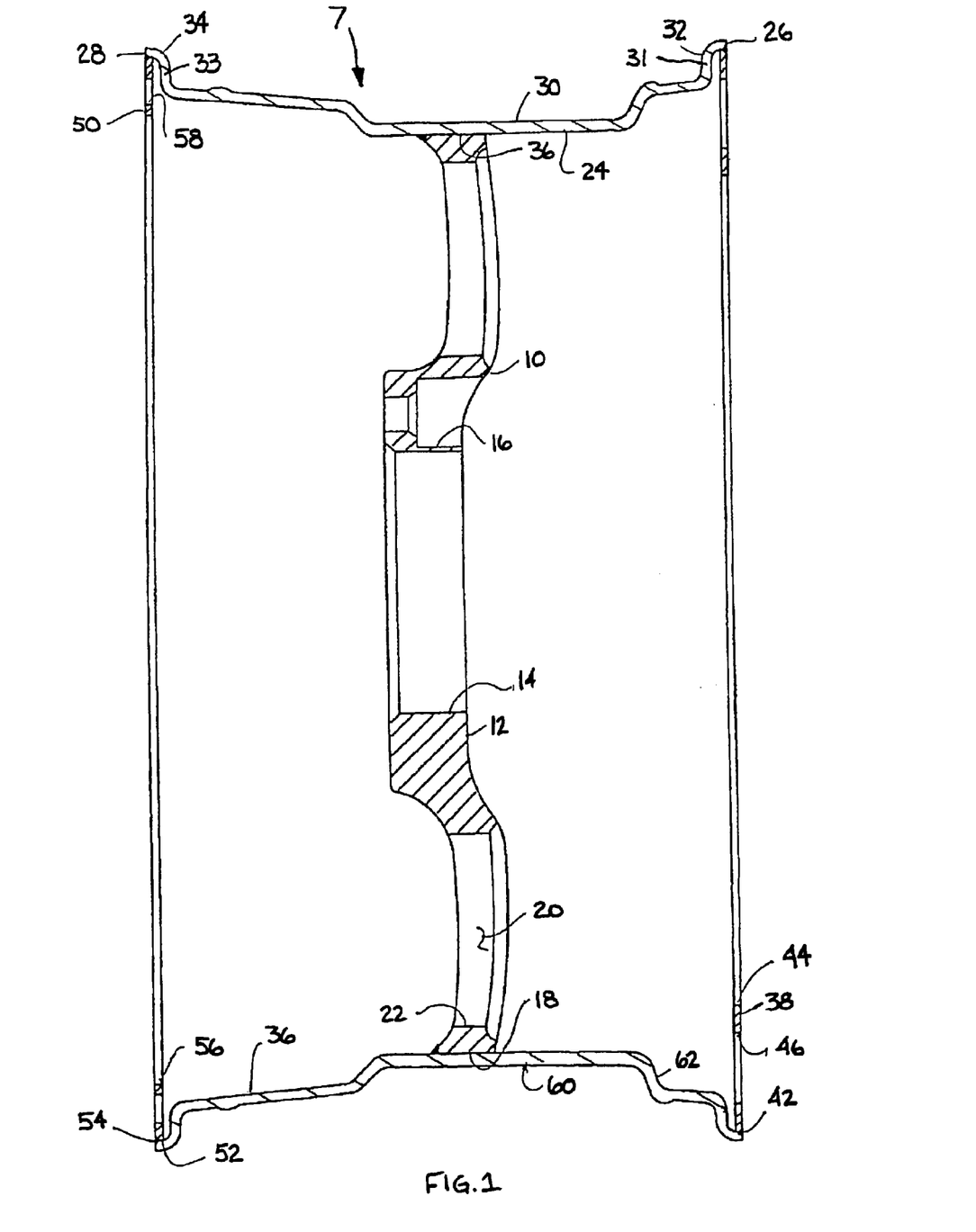
FIG. 1 is a sectional view of a preferred embodiment multiple passenger vehicle wheel arrangement according to the present invention.
Figure 2:
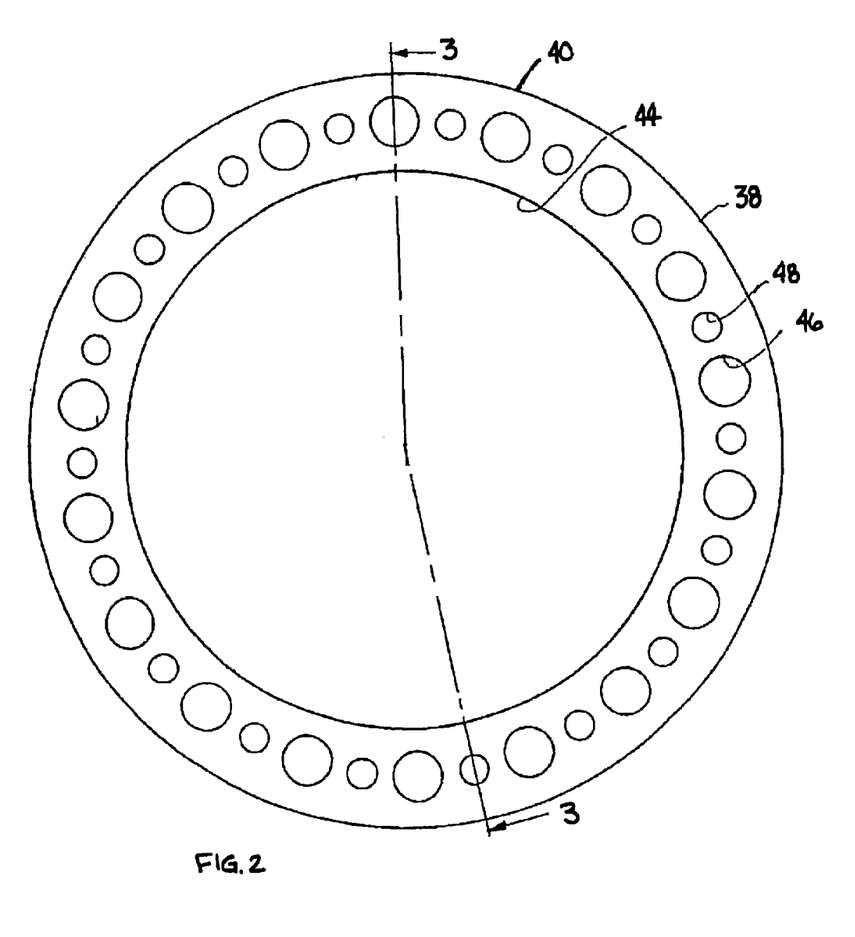
FIG. 2 is an elevational view of inboard reinforcing ring shown in the full arrangement shown in FIG. 1.
Figure 3:
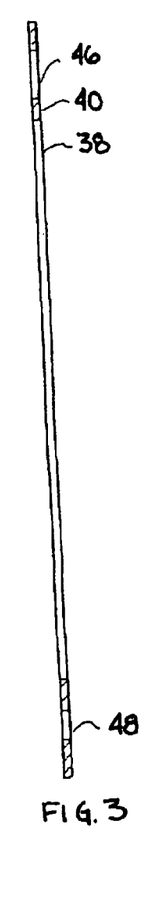
FIG. 3 is a sectional view of the outboard reinforcement ring shown in FIG. 2 taking along lines 3—3.
Figure 4:
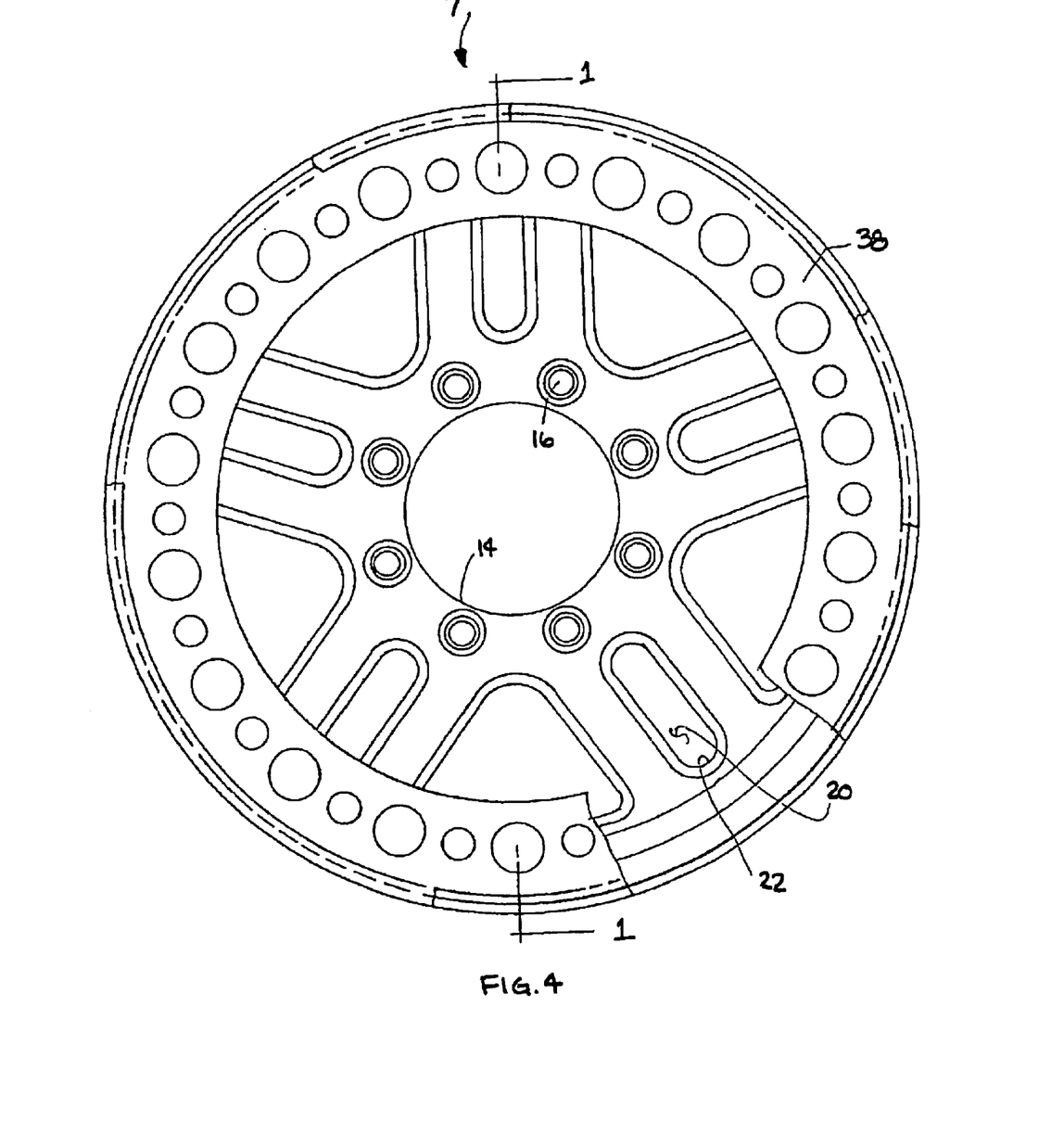
FIG. 4 is a front elevational partial cut-away view of the vehicle wheel arrangement shown in FIG. 1.
Figure 5:
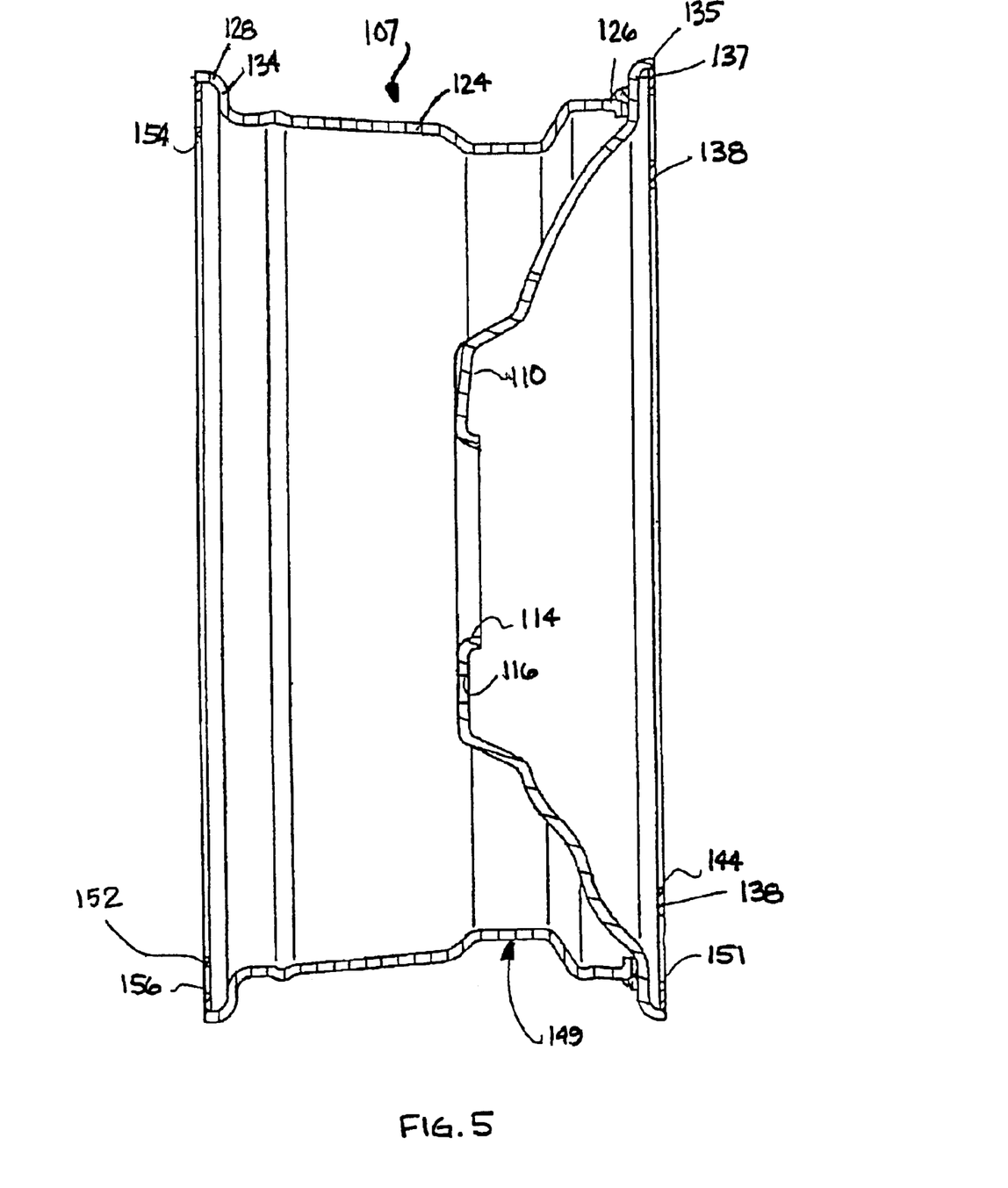
FIG. 5 is a side elevational view similar to FIG. 1 of an alternate preferred embodiment automobile passenger vehicle wheel arrangement according to the present invention.

Referring to FIG. 5 an alternate preferred embodiment wheel arrangement 107 is provided. The wheel arrangement 107 has a wheel disc 110 which is provided by a stamping. The wheel disc 110 has a pilot aperture 114 and a plurality of concentric geometrically speed lug receiving apertures 116 (only one shown). The wheel arrangement 107 has a drum 124 which has an extreme outboard end 126 weldably connected to the wheel disc 110. An extreme inboard end 128 forms an inboard tire bead seat 134. An extreme outboard end 135 of the wheel disc forms an outboard tire bead seat 137. An outboard reinforcing ring 138 has its outer diameter weldably continuously connected to an inner diameter of the outboard car seat 137. The outboard reinforcing ring 138 has an inner diameter 144 that is smaller than a minimum diameter 149 of the drum. The outboard reinforcing ring additionally has apertures 151 which perform a function similar to those described for apertures 46 for wheel arrangement 7.

The wheel arrangement 107 also has an inboard reinforcing ring 152 which has an outer diameter which is continuously weldably connected to the inboard tire bead seat 134. The inboard reinforcing ring 152 has an inner diameter 154 which is greater than the minimum diameter 149 of the drum and which is significantly greater than the inner diameter 144 of the outboard reinforcing ring. The inboard reinforcing ring 152 has a radial width which is significantly smaller than the radial length of the outboard reinforcing ring 138. In a manner as previously described the outboard reinforcing ring has a series of apertures 156 which allow for the removal of moisture.

Figure 6:
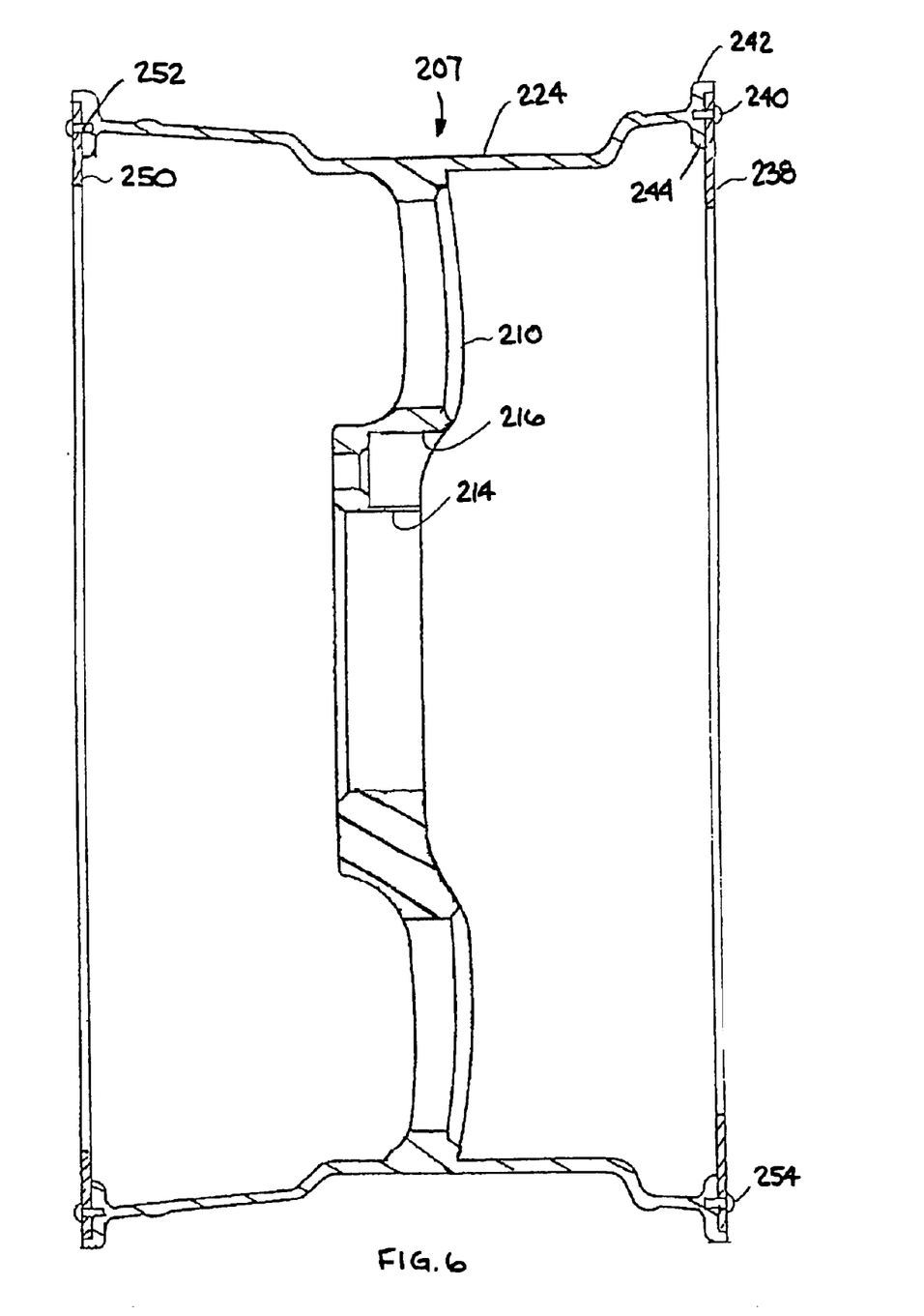
FIG. 6 is a sectional view of yet another alternate preferred embodiment multiple passenger vehicle wheel arrangement according to the present invention.
Figure 7:
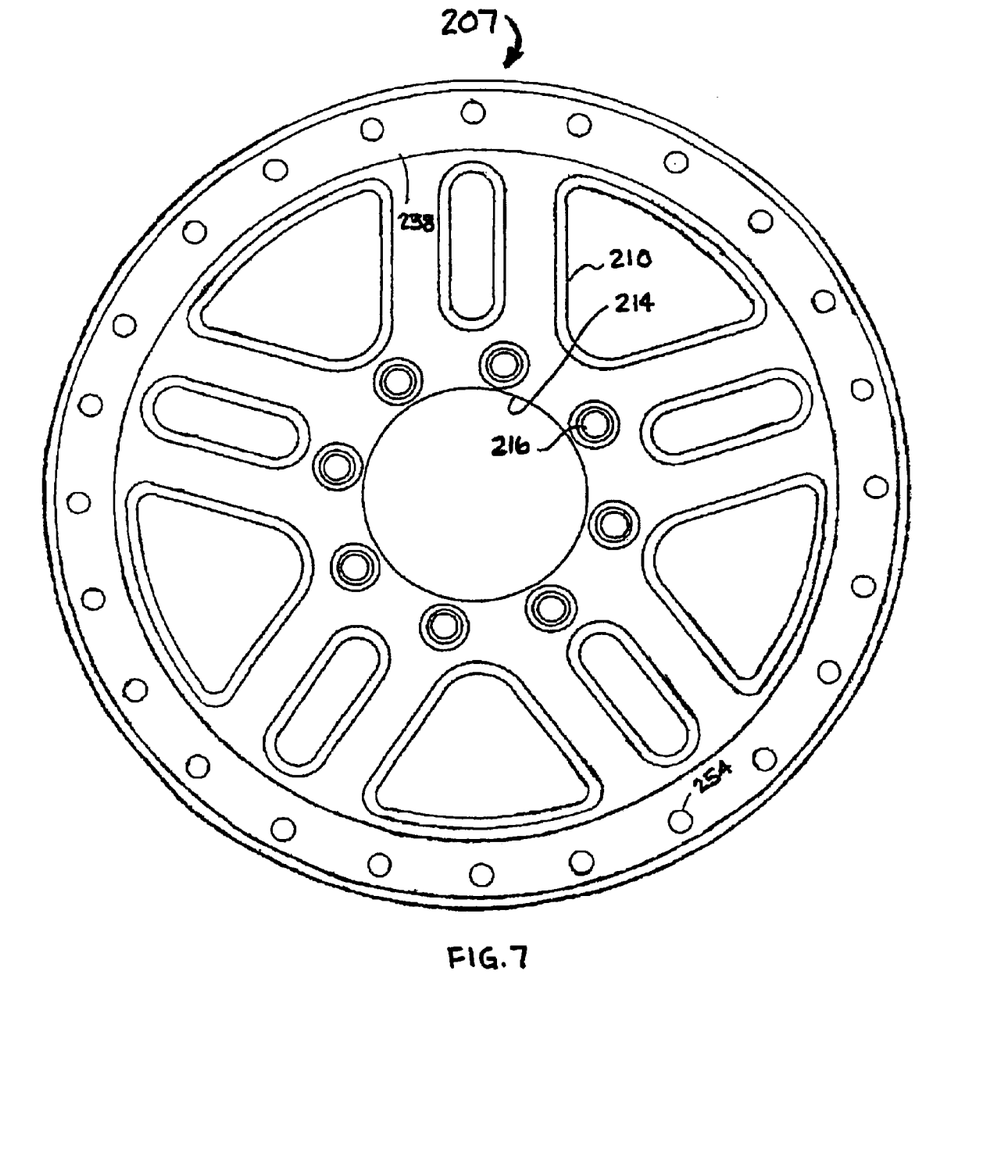
FIG. 7 is an elevational view of the vehicle wheel arrangement shown in FIG. 6.

Referring to FIGS. 6 and 7, an alternate preferred embodiment wheel arrangement 207 is provided. The wheel arrangement 207 has a wheel disc 210 with a pilot aperture 214 and a plurality of concentric geometrically spaced lug receiving apertures 216 (only one shown in FIG. 6). The wheel arrangement 207 has a drum 224 which in a molding operation is integrally cast with the wheel disc 210. The wheel arrangement 207 has an outboard reinforcement ring 238 which is fastener connected to the drum 224 by a series of bolts 240. The bolts 240 connect the outboard reinforcement ring 238 to an inner diameter of the outboard tire bead seat 242 along an outer radial half of the outboard reinforcement ring 238. The outboard tire bead seat 242 has a inward radially projecting flange 244 which supports a substantial portion of the outboard reinforcement ring 238. In a similar fashion, the wheel arrangement 207 has an inboard reinforcement ring 250 which is connected to the wheel drum 224 by a series of bolt fasteners 252. In many instances the heads of 254 of the bolts 240 will add to the decorative nature of the inboard reinforcing ring 238.

The present invention has been shown in a preferred embodiment. It will be apparent to those skilled in the art of the various changes and modifications which can be made to the present invention without departing from the spirit and scope of the present invention as it has been revealed in the application and as encompassed in the following claims.

I claim:

1. An arrangement of an automotive motor multiple passenger vehicle wheel comprising:

a wheel disc having a central body with a pilot aperture encircled by concentric lug receiving apertures;

a drum having inboard and outboard extreme ends, said drum being fixably connected to said wheel disc;

an outboard tire bead seat along an outer diameter of an outboard extreme end of one of said wheel disc and said drum;

an inboard tire bead seat along an outer diameter of said drum inboard extreme end;

an outboard reinforcement ring having an outer diameter connected to an inner diameter of said outboard tire bead seat; and an inboard reinforcing ring having an outer diameter connected to an inner diameter of said inboard tire bead seat, said inboard reinforcing ring having an inner diameter significantly larger than an inner diameter of said outboard reinforcement ring and said inboard reinforcement ring having a radial width significantly smaller than a radial width of said outboard reinforcement ring.

2. An arrangement as described in claim 1 wherein said outboard reinforcement ring is welded to said outboard tire seat.

3. An arrangement as described in claim 1 wherein said inboard reinforcement ring is welded to said inboard tire seat.

4. An arrangement of a wheel as described in claim 1 wherein said outboard reinforcement ring is generally continuously welded to said outboard tire bead seat.

5. An arrangement of a wheel as described in claim 1 wherein said inboard reinforcement ring is generally continuously welded to said inboard tire bead seat.

6. An arrangement of a wheel as described in claim 1 wherein said outboard reinforcement ring has apertures to allow for the removal of entrapped moisture.

7. An arrangement of a wheel as described in claim 1 wherein said inboard reinforcement ring has apertures to allow for removal of entrapped moisture between said inboard reinforcement ring and said drum.

8. An arrangement of a wheel as described in claim 1 wherein said outboard reinforcement ring inner diameter is smaller than an outer diameter of said wheel disc.

9. An arrangement of a wheel as described in claim 1 wherein said wheel disc has spoke holes and wherein said spoke holes have an outer diameter and wherein said outboard reinforcement ring inner diameter is smaller than said spoke holes' outer diameter.

10. An arrangement of a wheel as described in claim 1 wherein said inboard reinforcement ring inner diameter is larger than said an outer diameter of said wheel disc.

11. An arrangement of a wheel as described in claim 1 wherein said outboard reinforcement ring and said inboard reinforcement ring have a generally equal outer diameters.

12. A wheel arrangement as described in claim 1 wherein said wheel drum is welded to said wheel disc.

13. A wheel arrangement as described in claim 1 wherein said drum is intergrally cast with said wheel disc.

14. An arrangement of a wheel as described in claim 1 wherein a ratio of radial width of said inboard reinforcement ring to said outboard reinforcement ring is generally equal to one half or less.

15. An arrangement of a wheel as described in claim 1 wherein an outboard extreme end of said drum is connected with said wheel disc and a portion of said wheel disc forms said outboard tire bead seat.

16. An arrangement of a wheel as described in claim 1 wherein a ratio of thickness between said outboard reinforcement ring to a thickness of said drum is between 1:1.5 to 1:0.75.

17. A wheel arrangement as described in claim 1 wherein said outboard tire bead seat has a radially inward extending flange portion to support said outboard reinforcement ring.

18. An arrangement of a wheel as described in claim 1 wherein said inboard reinforcement ring is fastener connected to said drum.

19. An arrangement of a wheel as described in claim 18 wherein said fastener is a bolt.

20. An arrangement of an automotive motor multiple passenger vehicle wheel comprising:

a wheel disc having a central body with a pilot aperture encircled by concentric lug receiving apertures;

a drum having inboard and outboard extreme ends, said drum being fixably connected to said wheel disc;

an outboard tire bead seat along an outer diameter of an outboard extreme end of one of said wheel disc and said drum;

an inboard tire bead seat along an outer diameter of said drum inboard extreme end;

an outboard reinforcement ring fastener connected to an inner diameter of said outboard tire bead seat; and an inboard reinforcing ring connected to an inner diameter of said inboard tire bead seat, said inboard reinforcing ring having an inner diameter significantly larger than an inner diameter of said outboard reinforcement ring and said inboard reinforcement ring having a radial width significantly smaller than a radial width of said outboard reinforcement ring.

21. An arrangement of a wheel as described in claim 20 wherein said fasteners are bolts.

22. An arrangement of a wheel as described in claim 20 wherein said fasteners are connected to an outer radial half of said outboard reinforcement ring to said outboard tire bead seat.

23. An arrangement of an automotive motor multiple passenger vehicle wheel comprising:

a wheel disc having a central body with a pilot aperture encircled by concentric lug receiving apertures, said wheel disc further having an outer diameter surface;

a drum having inboard and outboard extreme ends, said drum having along an outer diameter surface tire bead seats along inboard and outboard extreme ends, said drum being fixably connected to said wheel disc outer diameter surface along an inner diameter surface of said drum between said inboard and outboard extreme ends of said drum;

an outboard reinforcement ring having an outer diameter welded to said inner diameter surface of said drum adjacent said outboard extreme end of said drum; said outboard reinforcement ring having an inner diameter less than an outer diameter of said wheel disc; and an inboard reinforcing ring having an inner diameter welded to said inner diameter surface of said drum adjacent said drum extreme inboard end, said inboard reinforcing ring having an inner diameter significantly larger than said outboard reinforcement ring inner diameter and said outboard reinforcement ring having a radial width significantly smaller than a radial width of said outboard reinforcement ring.

24. An arrangement of an automotive multiple passenger vehicle wheel comprising:

a wheel disc having a central body with a central pilot aperture, said pilot aperture being encircled by concentric lug receiving apertures, said wheel disc having an outer diameter surface and said wheel disc having spoke holes with an outer diameter surface;

a drum with inboard and outboard extreme ends, said drum having an outer diameter surface with tire bead seats along said drum extreme inboard and outboard ends said drum being weldably connected to said wheel disc outer diameter surface between said drum inboard and outboard extreme ends;

an outboard reinforcement ring having an outer diameter generally continuously welded to said inner diameter surface of said drum adjacent to said extreme outboard end of said drum, said wheel reinforcement ring having an inner diameter less than said outer diameter of said wheel disc spoke holes, said outboard reinforcement ring having apertures to allow for the removal of entrapped moisture between said outboard reinforcement ring and said drum; and an inboard reinforcement ring having an outer diameter generally continuously welded to said inner diameter surface of said drum adjacent to said drum extreme inboard end, said inboard reinforcement ring having an outer diameter generally equal to an outer diameter of said outboard reinforcement ring and said inboard reinforcement ring having an inner diameter significantly larger than said outboard reinforcement ring inner diameter and wherein said inboard reinforcement ring inner diameter has a diameter greater than an outer diameter of said wheel disc and said outboard reinforcement ring having a radial width less than one-half of a radial width of the said outboard reinforcement ring.

* * * * *